(12) United States Patent
DerMarderosian et al.

(10) Patent No.: US 7,740,125 B2
(45) Date of Patent: Jun. 22, 2010

(54) COMPONENT FEEDING WITH CONTINUOUS MOTION ESCAPEMENT

(75) Inventors: Dikrun DerMarderosian, Quincy, MA (US); Matthew T. Brightman, Fall River, MA (US)

(73) Assignee: The Gillette Company, Boston, MA (US)

( * ) Notice: Subject to any disclaimer, the term of this patent is extended or adjusted under 35 U.S.C. 154(b) by 844 days.

(21) Appl. No.: 11/647,820

(22) Filed: Dec. 29, 2006

(65) Prior Publication Data

US 2008/0156824 A1 Jul. 3, 2008

(51) Int. Cl.
*B65G 47/04* (2006.01)
(52) U.S. Cl. ............... 198/476.1; 198/477.1; 198/474.1
(58) Field of Classification Search ............ 198/470.1, 198/476.1, 477.1, 474.1
See application file for complete search history.

(56) References Cited

U.S. PATENT DOCUMENTS

| | | | |
|---|---|---|---|
| 1,182,619 A | 5/1916 | Bagg | |
| 1,201,626 A | 10/1916 | Reynolds | |
| 1,283,579 A | 11/1918 | Smith | |
| 1,846,009 A * | 2/1932 | White et al. | 198/477.1 |
| 2,275,978 A * | 3/1942 | Mingle | 198/476.1 |
| 3,155,221 A * | 11/1964 | Griner | 198/419.3 |
| 3,471,000 A | 10/1969 | Bodolay et al. | |
| 3,601,041 A | 8/1971 | Perra, Jr. et al. | |
| 3,658,207 A | 4/1972 | Schultz | |
| 3,747,737 A * | 7/1973 | Brooke | 198/377.06 |
| 3,912,120 A | 10/1975 | Hoppmann et al. | |
| 3,960,293 A | 6/1976 | Sweet et al. | |
| 3,986,636 A | 10/1976 | Hoppmann et al. | |
| 4,279,336 A | 7/1981 | Henderson et al. | |
| 4,511,027 A * | 4/1985 | Zamboni | 198/470.1 |
| 4,526,269 A | 7/1985 | Henderson et al. | |
| 4,576,209 A | 3/1986 | Eisenberg | |
| 4,767,487 A * | 8/1988 | Tomsovic, Jr. | 198/476.1 |
| 4,821,920 A | 4/1989 | Lin et al. | |
| 4,938,341 A * | 7/1990 | Bogatzki | 198/474.1 |
| 5,413,210 A | 5/1995 | Turner et al. | |
| 5,740,899 A | 4/1998 | Pugh et al. | |
| 5,769,205 A * | 6/1998 | Belvederi et al. | 198/475.1 |
| 6,168,045 B1 | 1/2001 | Ansaloni | |
| 6,779,651 B1 * | 8/2004 | Linglet et al. | 198/803.9 |
| 6,848,566 B2 * | 2/2005 | Harnish et al. | 198/459.8 |
| 7,275,633 B2 * | 10/2007 | Zimmermann | 198/474.1 |
| 7,543,697 B2 * | 6/2009 | Legallais | 198/478.1 |
| 7,650,984 B2 * | 1/2010 | Giuliani et al. | 198/471.1 |
| 2004/0262127 A1 | 12/2004 | Harnish et al. | |

FOREIGN PATENT DOCUMENTS

DE 103 25 693 A1 7/2004
GB 528265 10/1940

* cited by examiner

*Primary Examiner*—James R Bidwell
(74) *Attorney, Agent, or Firm*—John M. Lipchitz; Kevin C. Johnson; Steven W. Miller

(57) ABSTRACT

The invention relates to methods and systems for transferring a stream of a components (28, 84, 100, 100'), either as individual components (28, 84, 100') or as a continuous strip (100) or band from which individual components are cut, from a component feeder (62a) to a component receiver (92, 108), e.g., in a processing machine, with controlled, e.g., continuous, motion escapement of the individual components (28, 84, 100, 100') from the feeder (62a).

27 Claims, 18 Drawing Sheets

COMPONENT FEEDING WITH CONTINUOUS MOTION ESCAPEMENT

TECHNICAL FIELD

This invention relates to devices and methods for loading parts or components into machines at high rates of speed in a continuous motion.

BACKGROUND

Component feeding in automated assembly machines involves three aspects: (i) singulation, which is the separation of multiple components so they can be manipulated individually, (ii) orientation, which is the manipulation of components into a specific orientation required for the next processing step; and (iii) escapement, which is the controlled separation and transfer of components from the end of a line and insertion into a processing machine, e.g., an assembly machine at a specific spacing between components, as required by the processing machine. Escapement can also include additional aspects of singulation and orientation.

U.S. Pat. No. 3,601,041 describes an apparatus for feeding and orienting parts such as tablets or capsules. Capsules are carried by a hopper set over a rotating disc having slotted radial paths. As the capsules fall from the hopper onto the rotating disc, the are centrifugally thrown toward the outer periphery along the slotted paths and urged into the slots in an end-to-end aligned relation. The capsules are passed between printing members in their oriented position and then discharged into a hopper.

U.S. Pat. No. 3,471,000 describes a mechanism for orienting and feeding items such as fruit and produce to a location for packaging. A conveyor delivers the items to a rotating mechanism. The rotating mechanism includes a plurality of radial arms, which, at a certain point in a cycle of rotation, rise to place the item on a shelf that rotates simultaneously with the radial arms. When the shelf reaches a particular station, the item is urged into a chute or outlet. This cycle is continuous during rotary motion of the mechanism.

U.S. Pat. Nos. 3,912,120, 3,960,293, 4,821,920 and 5,740,899 also describe rotating mechanisms and apparatus for feeding, orienting, and/or separating articles.

As shown in FIG. 1, known escapement mechanisms involve an intermittent feeding, also known as "slice" feeding, of components into processing machines. That is, each component, or batch of components, is stopped or slowed to a momentary standstill so that they can be transferred and then inserted into the processing machine at a predetermined spacing between components. Thus, the time interval during which the components are stopped creates the required spacing.

In general, a transfer disk 20, with a number of component holders 22, rotates about an axis 24 in the direction of arrow 26. As each component holder 22 moves into contact with the end of a stream of components 28, the holder captures the component, and separates it from the stream. The remaining parts in the stream 28 advance rapidly to position or location 30 vacated by the one taken and wait for the next component holder 22 to advance to position 30. This time delay results from the predetermined spacing 32 between the component holders 22 and thus between the components 28 as they exit the transfer disk 20 at location 34. As seen in FIG. 1, the distance along the curve between component holders 22 on disk 20 is essentially the same as the distance between the components after they exit the disk at position or location 34.

This slice feeding mechanism provides the required spacing between components, but requires that all components stop, one after the other. This process is thus wasteful in terms of energy and time, and significantly limits the overall processing speed. In addition, the jarring of components when they stop can lead to damage of the components and can impair their orientation, which is particularly important when working with asymmetrical and aspherical components that are processed at high speeds.

SUMMARY

The invention is based, in part, on the recognition that if one delivers a component to a capture location at a first distance from a central axis of a surface, e.g., a disk in the shape of a circle or polygon, and at a first radial position, and moves the component to a delivery location at a second radial position using a component holder that actively grips only one component at the capture location and deposits the component at the delivery location in a defined orientation; then one can achieve a smooth transfer of the component from one location to another in a controllable, continuous flow, and with a defined orientation, without the need to stop the components at any point along the transfer path.

In general, in one aspect, the invention features continuous motion escapement systems that include a rotatable disk including a central axis; a capture location at a first distance from the central axis and at a first radial position with respect to the central axis; a delivery location at a second radial position with respect to the central axis; and a plurality of component transfer mechanisms arranged on the disk, wherein each component transfer mechanism includes a component holder configured to actively grip only one component at the capture location, and wherein each component transfer mechanism is configured to move the component holder from the capture location to the delivery location, enable the component holder to deposit the component at the delivery location in a defined orientation, and return the now empty component holder to the capture location within one rotation or less of the disk.

In the new systems, the delivery location can be at a second distance from the central axis different than the first distance; and the distance of the component from the central axis can change as the component transfer mechanism moves the component from the capture location to the delivery location. The second distance can be smaller than, longer than, or the same as the first distance. For example, if the second distance is longer than the first distance, the spacing between the components as they leave the delivery location is increased compared to their spacing as they arrive at the capture location. In certain embodiments, the distance of the component from the central axis changes continuously as the component transfer mechanism moves the component from the capture location to the delivery location.

The systems can also include a drive that causes the disk to rotate about the central axis, and a controller that controls the speed of rotation, wherein a continuous rotation of the disk causes the component transfer mechanisms to deliver a continuous stream of components from the capture location to the delivery location. The systems can also include a component feeder that is arranged to singulate components and feed them to the capture location in an orientation that enables the component holder to grip individual components.

In various embodiments, the component transfer mechanisms can be arranged symmetrically on the disk about the central axis, and each component transfer mechanism can move the component holder radially outwardly from the capture location to the delivery location, where the second distance is larger than the first distance.

In other embodiments, each component transfer mechanism can move the component holder radially inwardly from the capture location to the delivery location, where the second distance is smaller than the first distance.

The component transfer mechanisms can include an arm having a distal end and a proximal end, wherein the component holder is attached to the distal end, and wherein the arm pivots about the proximal end causing the component holder to move from the first distance from the central axis to the second distance from the central axis. The systems with such arms can further include a cam, wherein the arms pivot in response to contact with the cam. For example, each arm can move the component holder radially outwardly from the capture location to the delivery location, wherein the second distance is larger than the first distance, or each arm can move the component holder radially inwardly from the capture location to the delivery location, wherein the first distance is larger than the second distance.

In certain aspects, the component transfer mechanisms can be blocks, wherein the component holders are attached to the blocks, and wherein as the disk rotates the blocks move from the first distance at the capture location to the second distance at the delivery location along a path parallel to a surface of the disk. These systems can further include a cam, wherein the blocks slide radially outwardly or inwardly in response to contact with the cam.

In these systems, as the disk rotates the component holders can move radially from the first distance at the capture location to the second distance at the delivery location along a path parallel to a surface of the disk, or the component holders can move radially from the first distance at the capture location to the second distance at the delivery location along a path at an angle to a surface of the disk. In certain embodiments the disk can be a circular or in the shape of a polygon.

In another aspect, the invention features methods of continuously transferring a stream of components from a capture location to a delivery location by capturing and gripping each component with a component transfer mechanism at a capture location at a first distance from, and at a first radial position of, a central axis; moving the component transfer mechanism gripping the component to a delivery location at a second radial position with respect to the central axis different from the first radial position; and depositing the component in a defined orientation into a component receiver at the delivery location.

In these methods, each component can be gripped individually, the delivery location can be at a second distance from the central axis different than the first distance, and the distance of the component from the central axis can change as the component transfer mechanism moves the component from the capture location to the delivery location. In certain embodiments, the distance of the component from the central axis changes continuously as the component moves from the capture location to the delivery location. In addition, a first spacing between components as they arrive at the capture location can be smaller or larger than (or the same as) a second spacing between components as they leave the delivery location, and the first distance from the central axis can be smaller or larger than (or the same as) the second distance from the central axis.

In various embodiments, the capture location can be positioned on a first plane, the delivery location can be positioned on a second plane, and the second plane can be at a different level then the first plane. For example, the first plane can be higher than the second plane, or the capture location and delivery locations can be on the same plane.

In some embodiments, the capture location is at an end of a component feeder, and the component receiver can include individual component holders into which the components are inserted in a predetermined orientation. The components can be fed to the capture location in a continuous stream and the first spacing between components can be, e.g., 30 mm or less. The components can leave the delivery location at a second spacing of, e.g., 50 mm or more. In some embodiments, the components can be in a first orientation at the capture location and can be released at the component receiver in a second orientation, that is either the same as or different than the first orientation.

The new methods and systems for controllable or continuous motion escapement avoid the loss of energy and efficiency often found in intermittent or "slice feeding" motion escapement systems. In addition, the new methods and systems avoid mechanical jarring of the components, which can prevent damage and loss due to jamming of components in processing systems. The systems also provide positive gripping and precise orientation of individual components as they are transferred from a capture location to a delivery location. The result is a system that provides a controllable, e.g., continuous flow of components from a component feeder to a component receiver at a very high rate of speed with little or no misalignments or loss or damage of components. The systems also provide the means for reorienting components at high speed by incorporating appropriate axes of motion within the component holder. Thus, the components may be rotated or flipped in a controlled manner to any desired orientation during the transfer from capture location to delivery location.

In these methods and systems, the components enter the system at a velocity equal to the product of the desired feed rate multiplied by the incoming component spacing and exit the system at a velocity equal to the feed rate multiplied by the desired component spacing.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

Other features and advantages of the invention will be apparent from the following detailed description, and from the claims.

BRIEF DESCRIPTION OF DRAWINGS

FIG. 6A shows the mechanism entering the overhead cam track, FIG. 6B shows the mechanism depositing the cartridge, and FIG. 6C shows the mechanism released from the cartridge, with the cartridge left in the puck.

Like reference symbols in the various drawings indicate like elements.

DETAILED DESCRIPTION

The invention relates to methods and systems for transferring a stream of a components, either as individual components or as a continuous strip from which individual components are cut, from a component feeder to a component receiver, e.g., in a processing machine, with controlled, continuous motion escapement of the individual components from the feeder. The new methods and systems will work for any size component.

General Methodology

Figure 1:
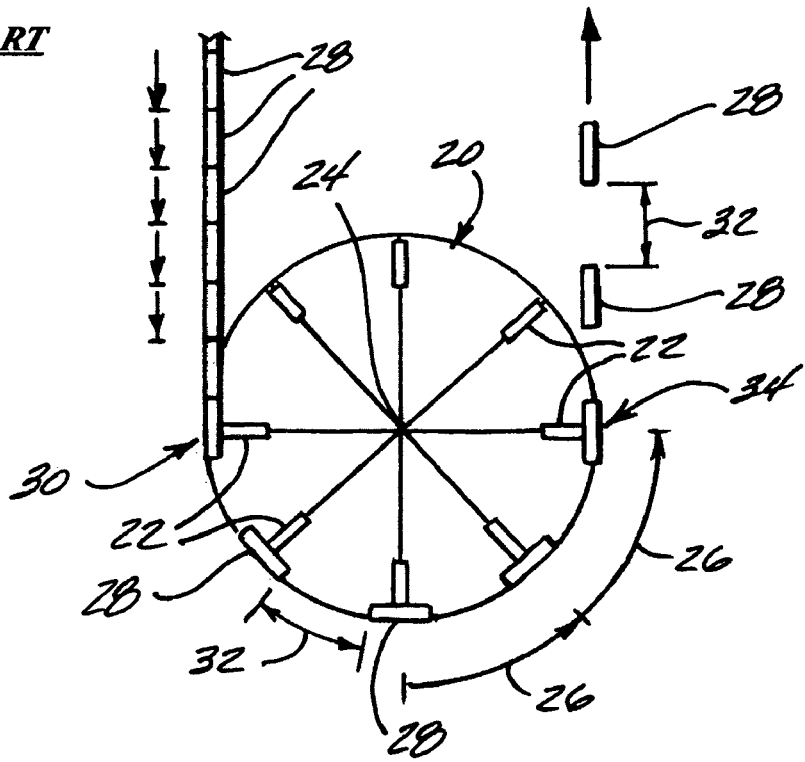
FIG. 1 is a schematic diagram of a prior art intermittent motion component escapement system.
Figure 2:
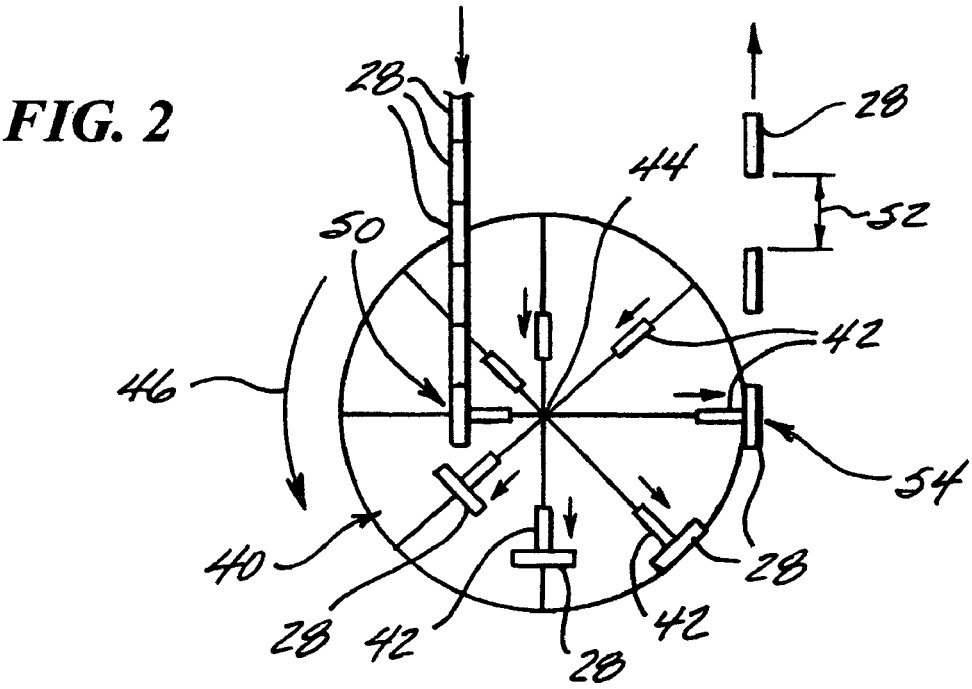
FIG. 2 is a schematic diagram of a new continuous motion component escapement system.
Figure 3A:
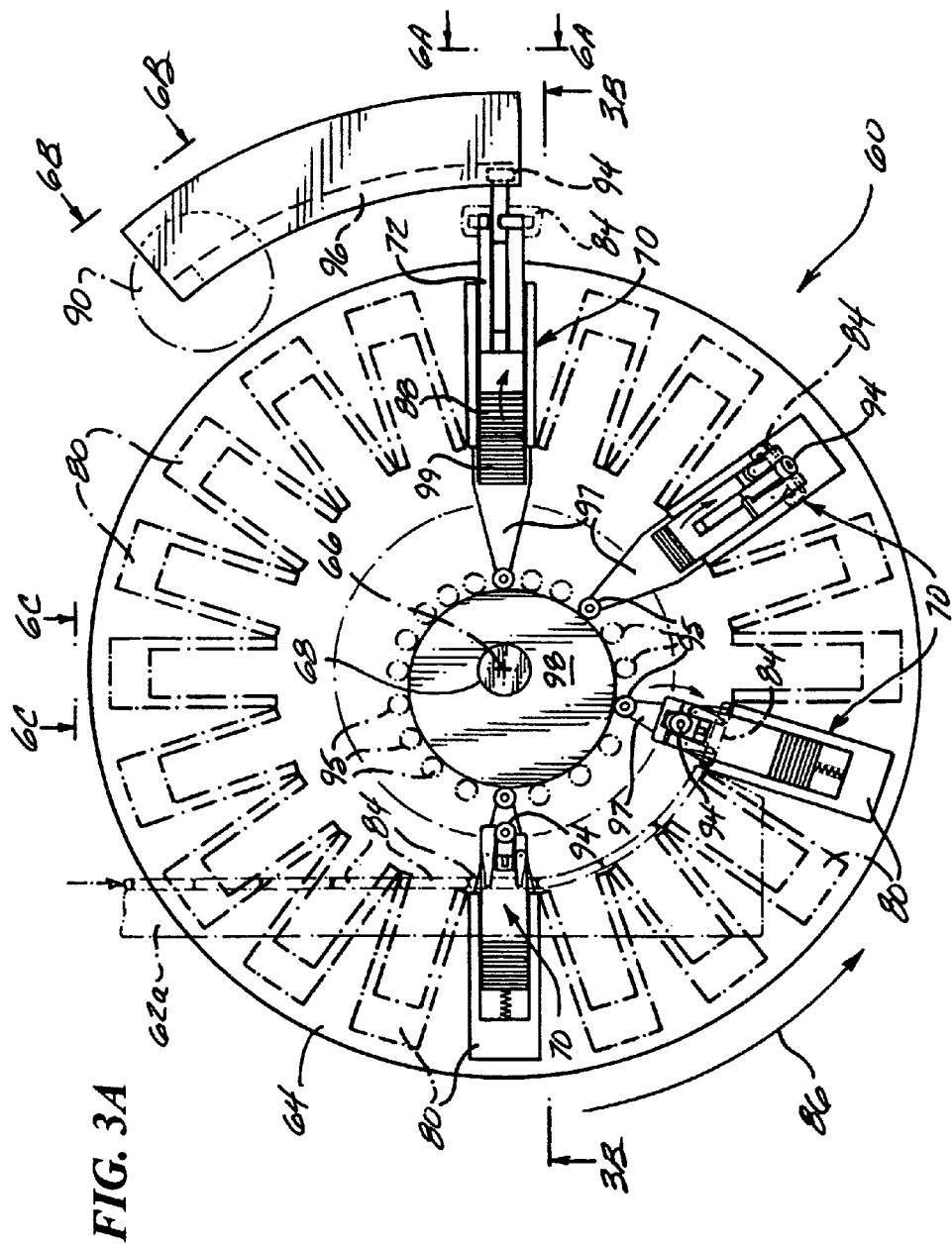
FIG. 3A is a schematic top plan view of a continuous motion escapement system for transferring plastic razor cartridge housings from a feeder to a continuous processing machine.
Figure 3B:
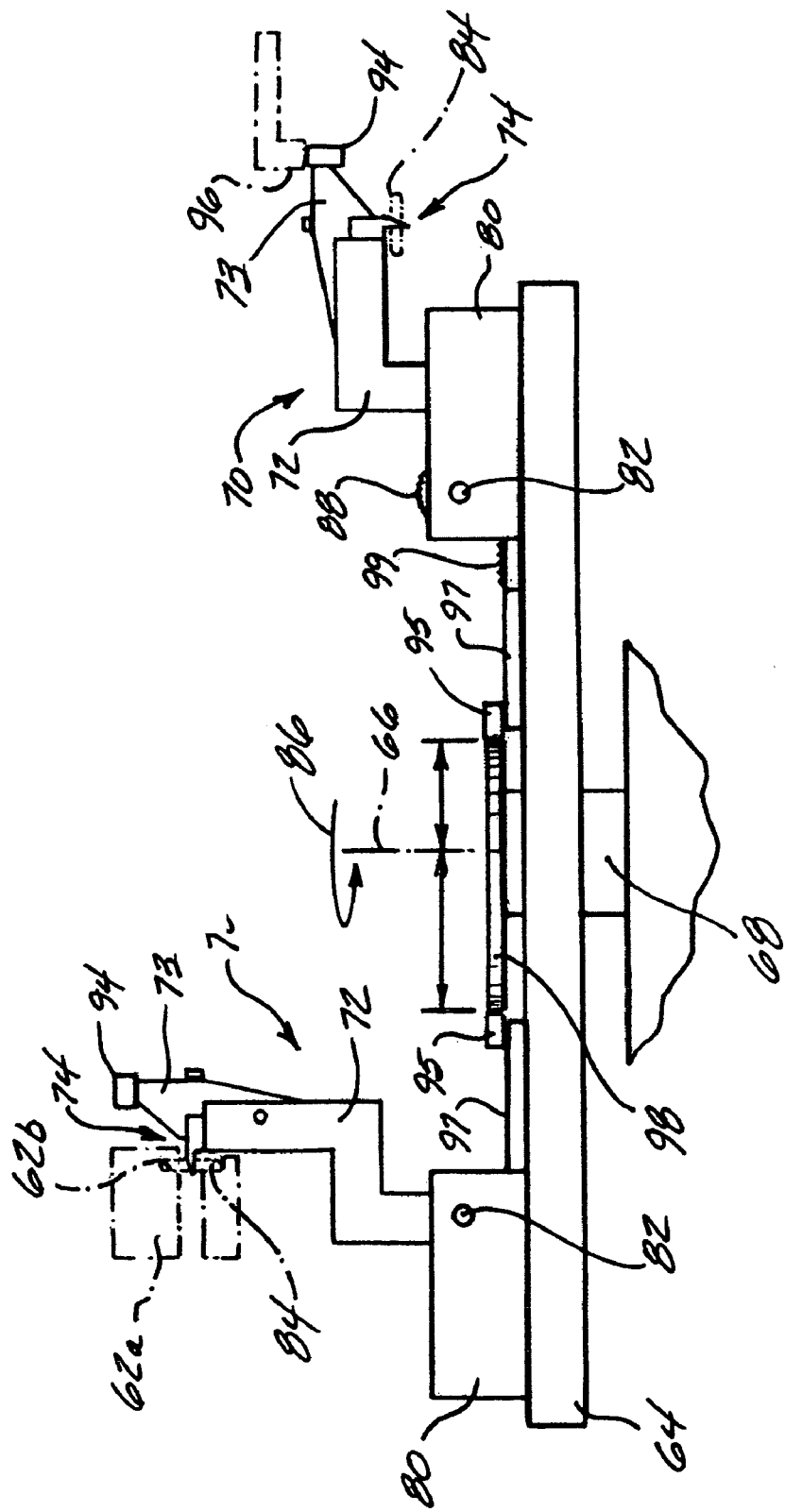
FIG. 3B is a schematic side view of FIG. 3B as seen from view line 3B-3B in FIG. 3A.
Figure 3C:
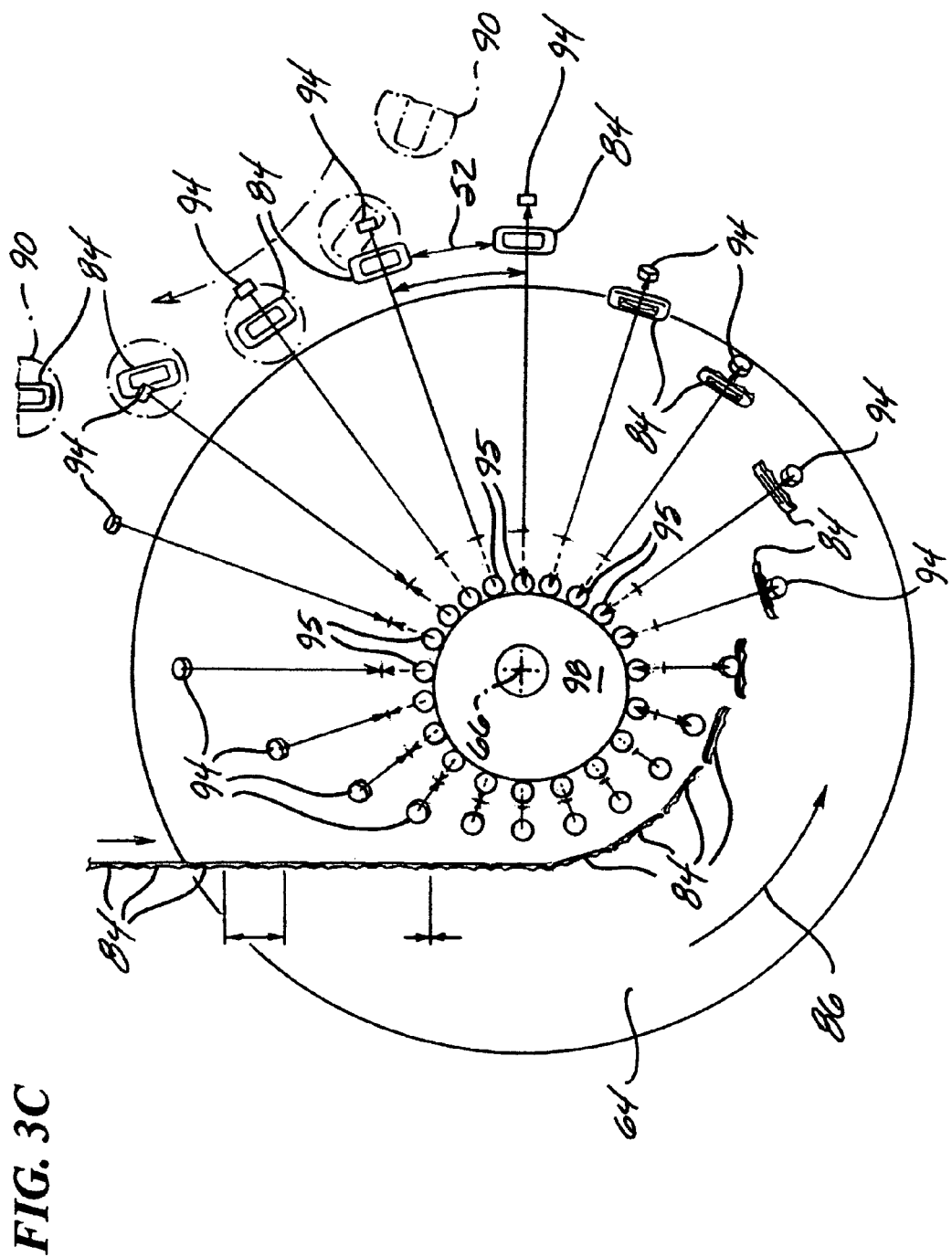
FIG. 3C is a schematic top plan view similar to FIG. 3A wherein only certain parts are shown for simplicity.

In general, as shown in FIG. 2, the new methods and systems involve a transfer surface, e.g., of a disk 40 (which can be circular or have some other shape, e.g., an oval, ellipse, or a polygon, such as an octagon, hexagon, pentagon, square, rectangle, or triangle), with a number of component holders 42. Disk 40 rotates about a central axis 44 in the direction of arrow 46. As each component holder 42 moves into contact with the end of a stream of components 28, the holder picks up a component at capture position or location 50, without the need for the entire stream of components to come to a stop. Instead, the new systems create the required spacing 52 between components after they leave the component holder 42, e.g., by continuously increasing the distance of a given component holder from central axis 44 as the holder moves from capture location 50 to delivery location 54 as disk 40 rotates. Thus, by the time the component holder reaches the delivery location, which in FIG. 2 is 180° from the capture location 50 (but can be at any location between about 90 and about 270° or more compared to the capture location), it has reached a distance from the central axis 44 that provides the required spacing 52 between components 28 as they exit the component holder at delivery location 54.

The required spacing may be the same as, smaller than, or larger than the spacing between components as they arrive at the capture location. In some embodiments, the spacing does not change at all, and the system is used to simply move components from a capture location to a delivery location in a controlled fashion, e.g., to provide a defined orientation to the component once it is deposited at the delivery location.

The new methods can be embodied in various devices and systems that can move components from a first distance from a central axis at a capture location to a second distance from the central axis at a delivery location. Thus, in general, the new methods include transferring a continuous stream of components that arrive at a capture location with a first spacing between components (e.g., little or no spacing between components) to component receivers with a second spacing between components that is different than the first spacing by capturing and gripping each component individually at a capture location at a first distance from a central axis of, and at a first radial position of a disk, e.g., a circle; moving each component to a delivery location at a second distance from the central axis, e.g., different than the first distance, and at a second radial position of the disk different from the first radial position; wherein the distance of the component from the central axis can change continuously, or essentially continuously, as the component is moved from the capture location to the delivery location; and depositing the component into a component receiver at the delivery location at the second spacing between components.

In certain embodiments of the new methods, the first spacing between components, such as individual plastic or metal parts, is smaller than the second spacing between components, and the first distance from the central axis is smaller than the second distance from the central axis. For example, the spacing may be almost zero mm, or only 1 or 2 mm, where the components arrive at the escapement apparatus in a stacked or almost stacked configuration. The spacing between the components is then increased to at least 10 mm or more, e.g., 20, 50, 75, or 100 mm or more. In the case of component feeding, the spacing between incoming components is essentially the length of the components touching end to end in the feed track. The second spacing would be the distance between component nests in the processing machine. A typical application might have components 10 to 30 mm long and processing nests spaced 25 to 100 mm or more apart.

In other embodiments, the first spacing between components can be larger than the second spacing between components, e.g., where the components arrive with a relatively large spacing, and need to be brought closer together for the next machine in a series or the components need to be removed from a processing machine and transferred into a feed track or onto a conveyor in a controlled, gentle manner. In this scenario, the first distance from the central axis is larger than the second distance from the central axis.

In certain embodiments, the first spacing between components can be the same as the second spacing between components, e.g., where the components arrive with a spacing that is about the same as the spacing needed for the next machine in a series. In this scenario, the first distance from the central axis is the same as the second distance from the central axis, and the system is used to provide a controlled, gentle transition of the components from the capture location to the delivery location. In some of these embodiments, the system is also used to manipulate the components in a way that aligns their orientation with the nest into which they are deposited. For example, the components may need to be rotated about one or more axes, e.g., they may need to be inverted from the orientation in which they arrive at the capture location.

In some embodiments, the capture location can be positioned on a first plane, and the delivery location can be positioned on a second, different plane, e.g., parallel with the first plane. The first plane can be higher or lower than the second plane. Both the capture location and delivery location can also be on the same plane. The change in plane can be accompanied by a change in distance from the central axis, or not.

In general, the new systems include a component transfer mechanism that grips, manipulates, and moves the component from the capture location to the delivery location. The component transfer mechanism typically includes a component holder, e.g., at a distal end of an arm or lever, that can include grasping or gripping jaws, hooks, fingers, one or more chucks, or other devices that can temporarily, but securely, hold individual components. The component holder maintains the component in a fixed orientation with respect to the holder in three-dimensional space, that can, but need not, change as the holder moves from the capture location to the delivery location. Thus, the components can be in a first relative orientation at the capture location and can be released or delivered at a component receiver in a second, different relative orientation. However, in some embodiments, the holder keeps the component in the same relative orientation in space as it moves the component from the capture location to the delivery location.

Continuous Motion Escapement Systems

The new methods can be embodied in various devices and systems. In general, the new continuous motion escapement apparatuses include at least the following elements: a rotatable plate or disk having a central axis; a capture location at a first distance from the central axis and at a first radial position of the disk; a delivery location at a second radial position of the disk, and optionally at a second distance from the central axis different than the first distance; and a plurality of component transfer mechanisms (e.g., 2, 5, 10, 20, 30, or more) arranged on the disk. Each component transfer mechanism includes a component holder configured to actively grip only one component (or a set number of components, e.g., 2, 3, or 4) at a time at the capture location.

The individual components can be supplied as separate components, or they can be supplied as a continuous strip of component material that is cut into separate, individual components as they enter, are in, or just after they exit the capture location.

The component transfer mechanisms are configured to move the component holder from the capture location to the delivery location, enable the component holder to release and deposit or deliver the component at the delivery location, and return the now empty component holder to the capture location within one rotation or less of the disk.

Continuous Feed of Individual Components

One such system is illustrated in FIGS. 3A-3C, 4A-4C, and 5, which show a continuous motion escapement system 60 arranged at the end of a component feeder 62a, and a plurality of component transfer mechanisms 70. The system includes a rotating disk 64 that has a central axis 66 and a central shaft 68. Each of the component transfer mechanisms 70 include an arm 72, a component holder 74 (see FIGS. 4A-4C), which includes a pair of gripping jaws 76 and 78 (shown in FIGS. 4A-4C), a base 80, and a pivot 82. Each pair of gripping jaws holds a component 84, e.g., a plastic razor cartridge housing. The component transfer mechanisms 70 can be arranged symmetrically on the disk about the central axis. Arms 72 have a distal end, to which is connected the component holder 74, and a proximal end, which ends in pivot 82.

Figure 6A:
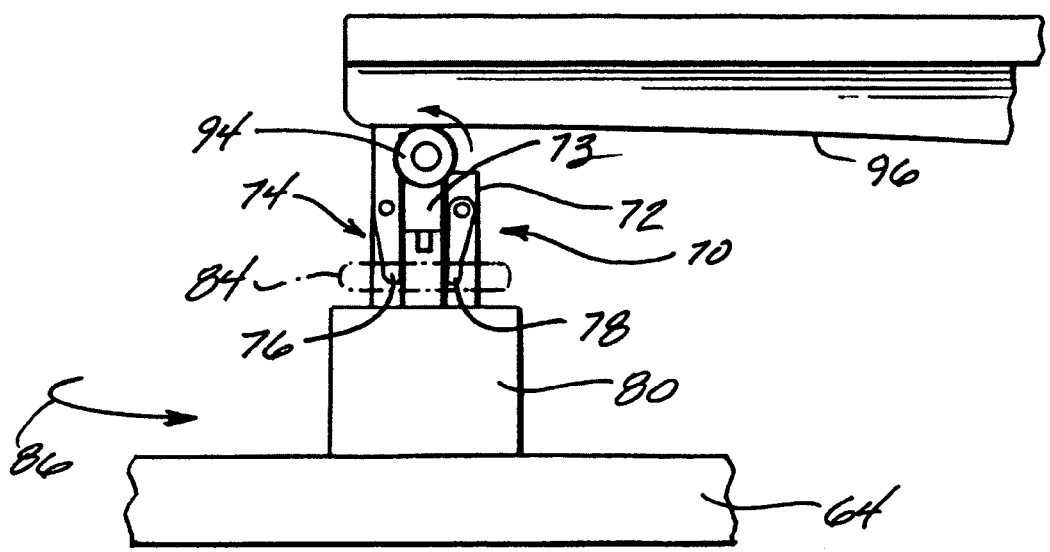
FIGS. 6A, 6B, and 6C are schematic diagrams of a component transfer mechanism of FIG. 4A at a delivery location depositing a plastic razor cartridge housing into a "nest" on a transfer puck, ready to move into a processing machine as seen from view lines 6A-6A, 6B-6B and 6C-6C in FIG. 3A, respectively.

Disk 64 rotates around central axis 66 in the direction of arrow 86. Rotation of arms 72 about pivot 82 is controlled by gear wheel sections 88. As disk 64 rotates, a stationary cam 98 (FIGS. 3A-3C, 4A, and 4B) causes each of the arms 72 to rotate from an upright capture position (as shown in FIGS. 3A-3C and 4A-4C) to a horizontal delivery position (as shown in FIG. 6A). Cam followers 95 are affixed to sliding members 97 within each arm base 80. Each sliding member incorporates a rack (linear gear) 99 that meshes with the circular gear wheel sections 88 attached to the pivotal arm 72. The follower 95 rides against a central stationary cam 98 and, as the disk rotates, the cam moves the follower-slider-rack in and out, which causes the gear segment and pivotal arm 72 to rotate about pivot 82.

Because the cam has a smooth contour, the distance of the component holder 74 (and thus the component) from the central axis 66 changes continuously as the component transfer mechanism 70 moves the component 84 from the capture location 50 (FIG. 2) to the delivery location 54 (FIG. 2).

Figure 4A:
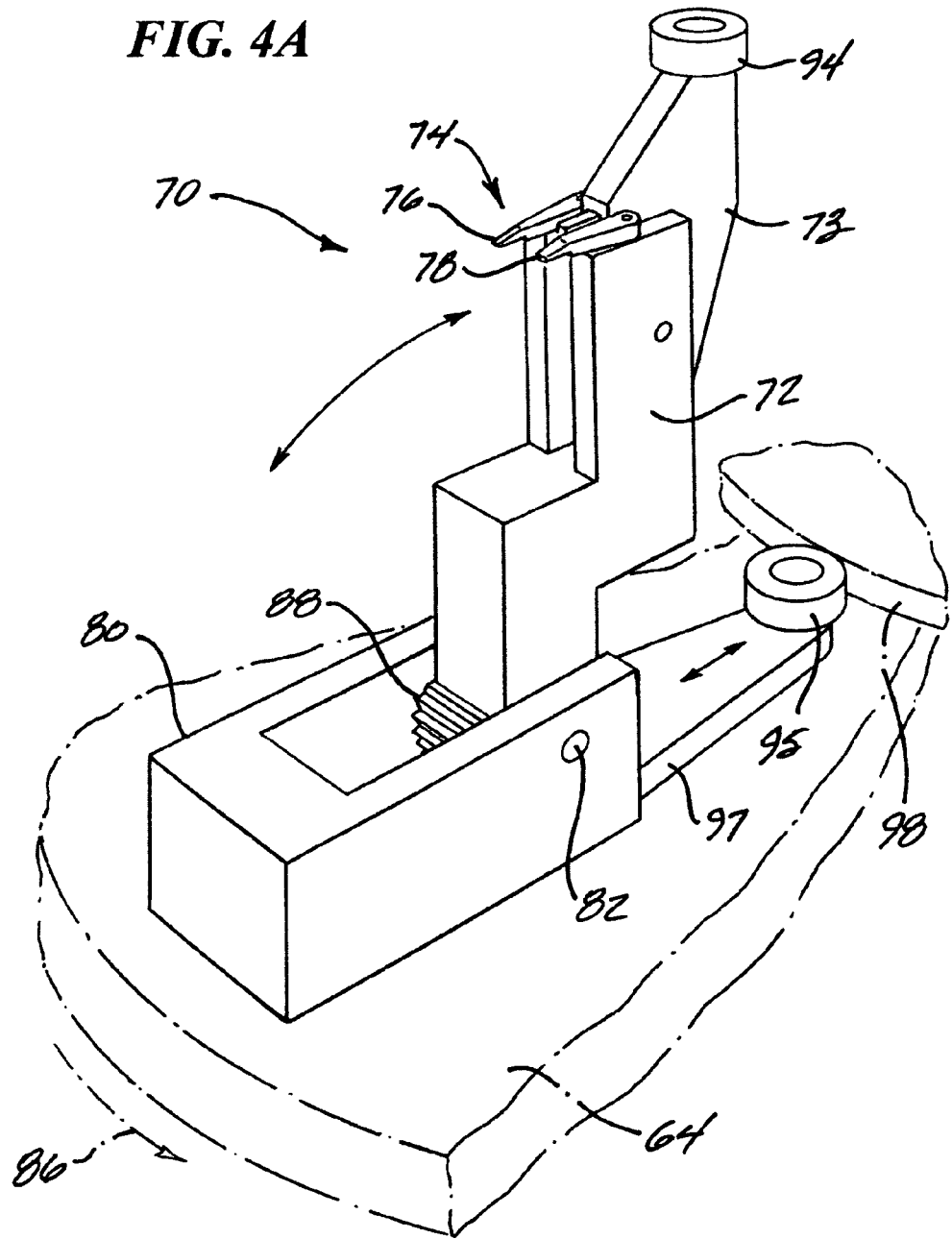
FIG. 4A is a schematic perspective view of a component transfer mechanism of the continuous motion escapement system of FIG. 3A.

FIG. 4A shows a more detailed view of an individual component transfer mechanism 70, including an arm 72, a component holder 74 with gripping jaws 76 and 78, base 80, and pivot 82. Arm 72 is in a vertical capture position, with jaws 76 and 78 positioned to accept a component. Mechanism 70 also includes a plunger 73 with a roller/cam follower 94. This plunger operates to temporarily hold component 84 in place once it is deposited into a component holder or "nest" 90 (see, FIGS. 3A and 6B). Component transfer mechanism 70 also includes a sliding member 97 with cam follower 95, which is pressed against stationary cam 98, as described in further detail below.

Figure 4B:
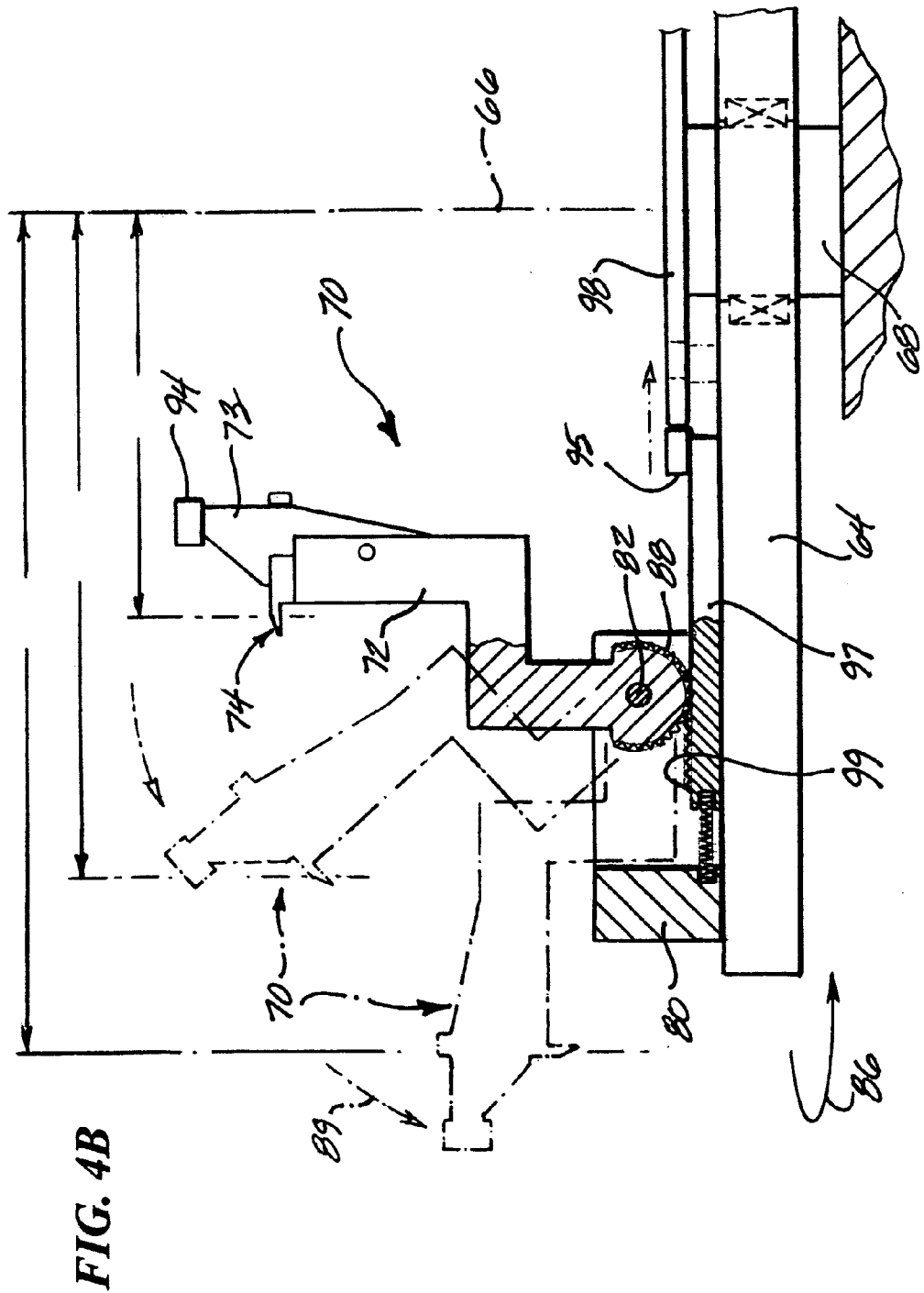
FIG. 4B is a schematic side view in partial cross-section of a component transfer mechanism of FIG. 4A.
Figure 4C:
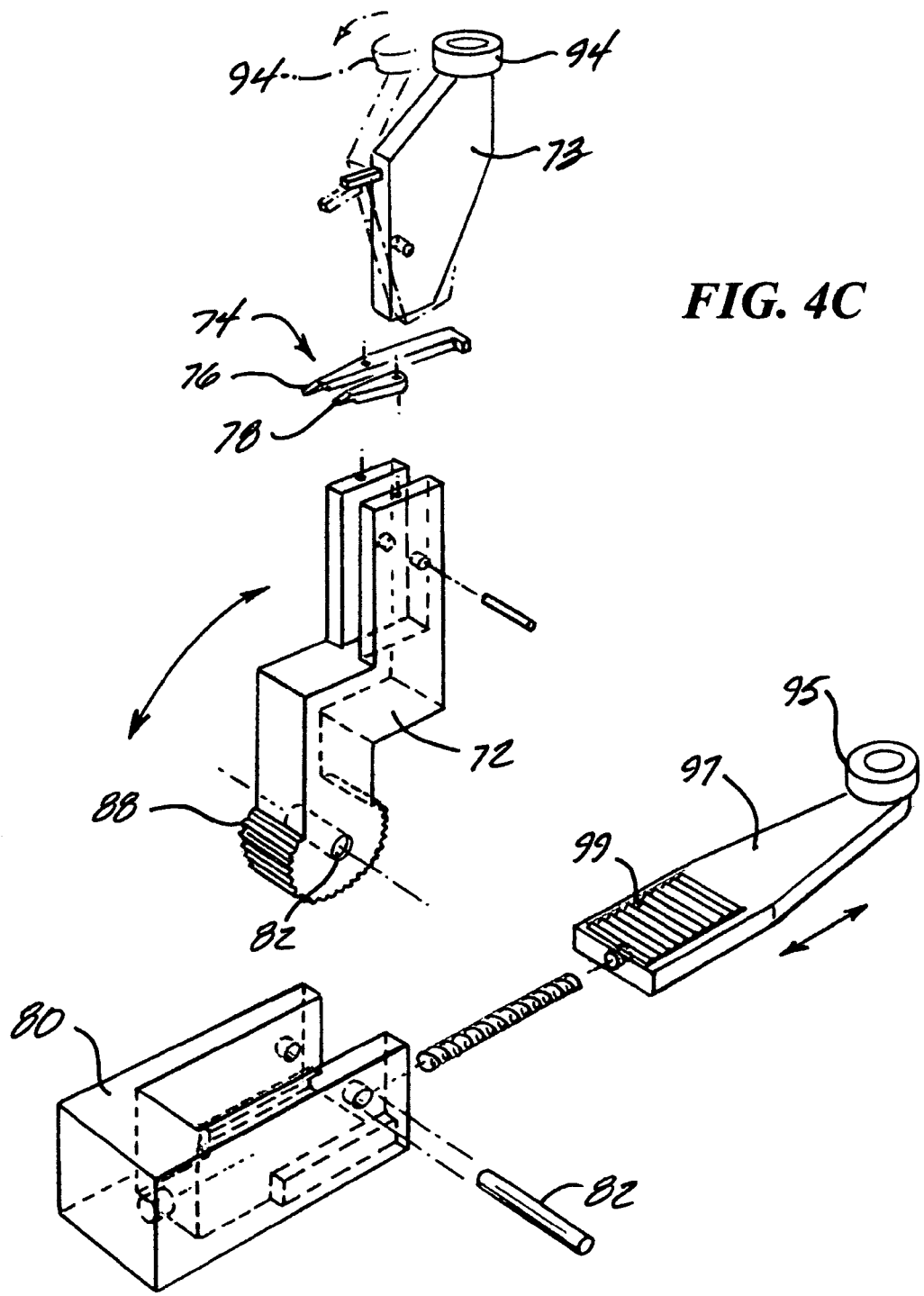
FIG. 4C is a schematic exploded perspective view of a component transfer mechanism of FIG. 4A.

FIG. 4B shows a side view of the component transfer mechanism 70 shown in FIG. 4A. As noted, this mechanism includes a roller/cam follower 95 fixed to a sliding member 97, which incorporates a linear gear 99 that engages with a circular gear section 88 attached to arm 72 at the pivot point 82. Coil springs 99' in base 80 bias the sliding member 97 radially inwardly, keeping the cam follower 95 pressed against the stationary cam 98 on central shaft 68. FIG. 4C shows an exploded view of the component transfer mechanism 70 shown in FIGS. 4A and 4B.

Figure 5:
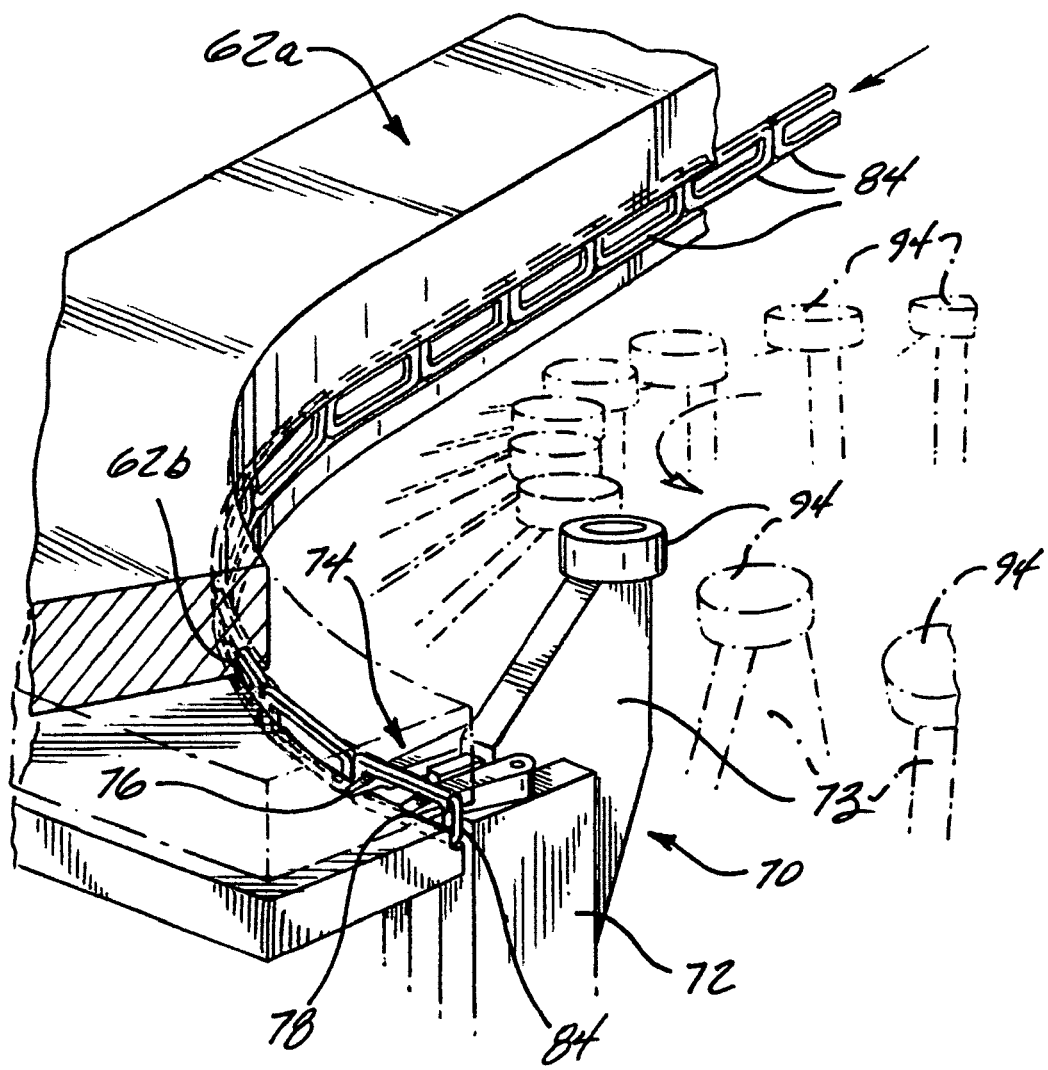
FIG. 5 is a schematic perspective view of a component transfer mechanism of FIG. 4A at a capture location gripping a plastic razor cartridge housing at the end of a guide track of a component feeder.

FIG. 5 shows an enlarged view of component holder 74, with gripping jaws 76 and 78 holding a plastic razor cartridge housing 84. The cartridge is still within a curved guide track 62b, an extension of component feeder 62a. One arm 72 and one component 84 are shown for clarity, but numerous arms and a stream of components follow behind the one shown. The stream of components 84 enter the curved track 62b under the influence of gravity or air pressure or other forces such that they abut end to end with slight pressure. As disk 64 (see, e.g., FIG. 3A) turns and the arms and jaws with captured components move around the curved track 62b, the stream of components follows and subsequent arms and jaws move outward to capture their adjacent components. The radial position of the arms is set, by the cam, such that the circumferential spacing between jaws equals the end-to-end spacing of the components in the curved track and, as such, there is no circumferential relative motion between the jaws and the components during capture, only the radial relative motion of the jaws to engage the component. The components follow the arms around at the speed of the disk, which is set as required for the processing machine. Once the components are captured, the curved track 62b ends and the arms 72 are free to move outward to transfer the component to the delivery position.

Figure 6B:
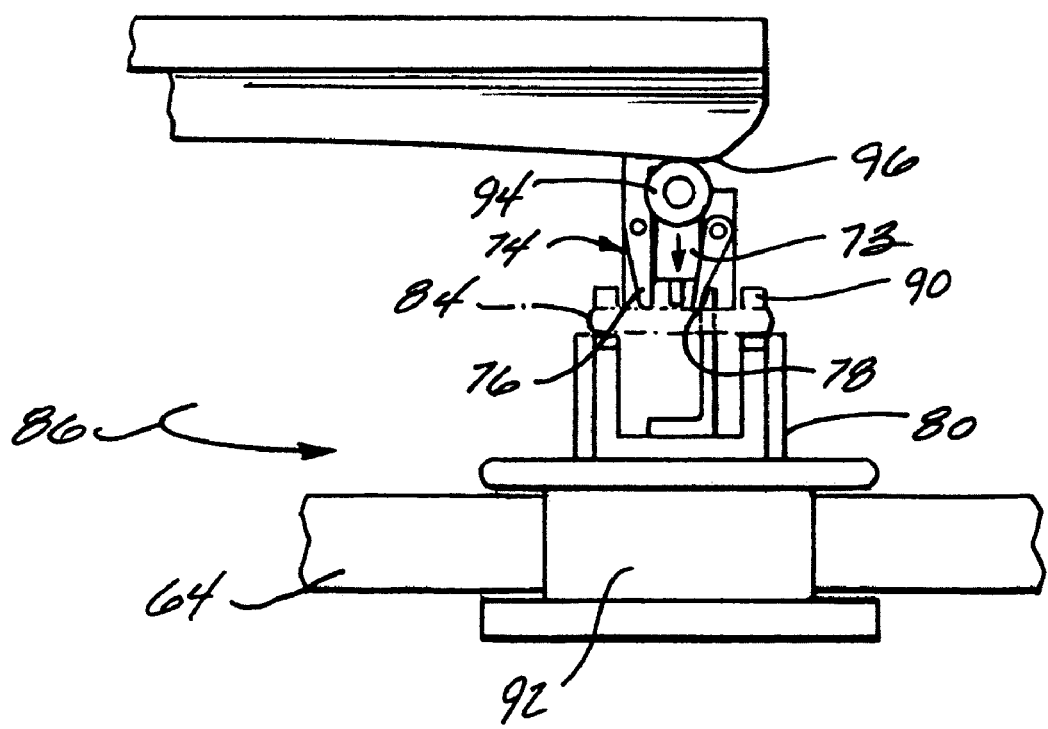

As shown in FIG. 6A, arm 72 has been rotated about 90° around pivot 82 into a horizontal delivery position (in the direction of arrow 89 in FIG. 4B) by virtue of the cam follower 95 riding against cam 98. Thus, arm 72, and component holder 74, move radially outwardly from the capture location to the delivery position at the delivery location. In this position, component holder 74 places component 84 into a component "nest" 90 riding on the rotating disk (as best seen in FIG. 6B). After placement, a positive action "stripper" mechanism is used to hold the component in the nest while the arm moves upward and disengages from the component.

Figure 6C:
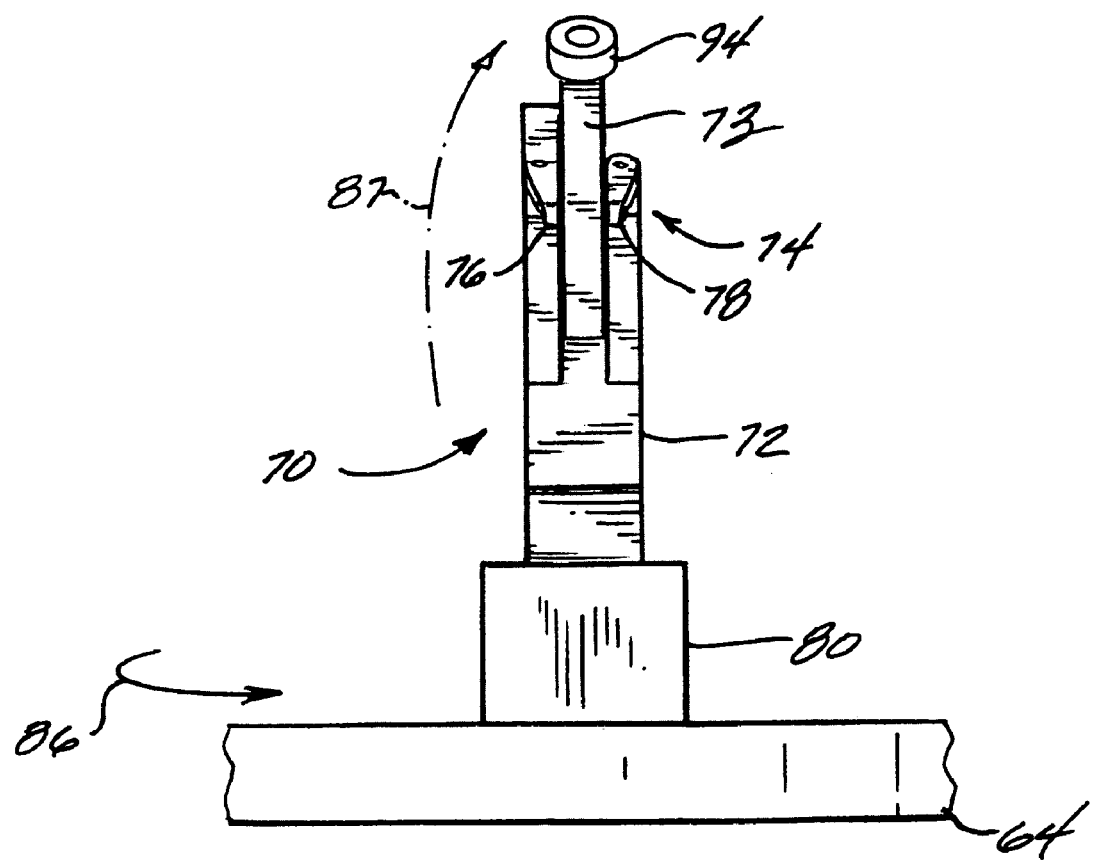

As disk 64 continues to rotate in the direction of arrow 86, a roller/cam follower 94 passes under a stationary overhead cam 96, which forces a plunger 73 down against component 84 and holds it in nest 90 as seen in FIG. 6B. While follower 94 is under stationary cam 96 holding the plunger 73 down and the cartridge in the nest, arm 72 begins to move upward, allowing spring loaded gripper fingers 76 and 78 to slip past and release the component, e.g., a cartridge, leaving it in nest 90. FIG. 6B shows plunger 73 and roller/cam follower 94 just about to leave from under stationary cam 96. FIG. 6C presents the same view as FIG. 6B, but a few degrees of rotation later, and shows that as disk 64 continues to rotate in the direction of arrow 86, overhead stationary cam 96 ends, which releases plunger 73 and allows arm 72 to move up to the vertical position in the direction of arrow 87, leaving component 84 behind in nest 90.

In this embodiment, the distance of the component holder to the central axis 66 increases from the capture location at the curved track 62b to the delivery location at the component receiver 92. This increase in distance translates into an increase in the spacing distance between components as they leave the delivery location. In addition, the component moves along a path that is at an angle to the surface of disk 64.

Note that FIGS. 6A-6C show only one of numerous component transfer mechanisms 70.

In other embodiments, each component transfer mechanism can move the component holder radially inwardly from the capture location to the delivery location. In these embodiments, the second distance from the central axis is smaller than the first distance from the central axis.

In other systems, each component transfer mechanism includes a block, wherein the component holder is attached to the block, and wherein as the disk rotates the block moves from the first distance at the capture location to the second distance at the delivery location along a path parallel to a surface of the disk. The block can move parallel to the surface of the disk or at an angle to the surface. In these systems, the blocks are moved by contact with a cam. For example, FIG. 7 shows a system for continuous motion escapement for component receivers or "transport pucks."

Figure 7:
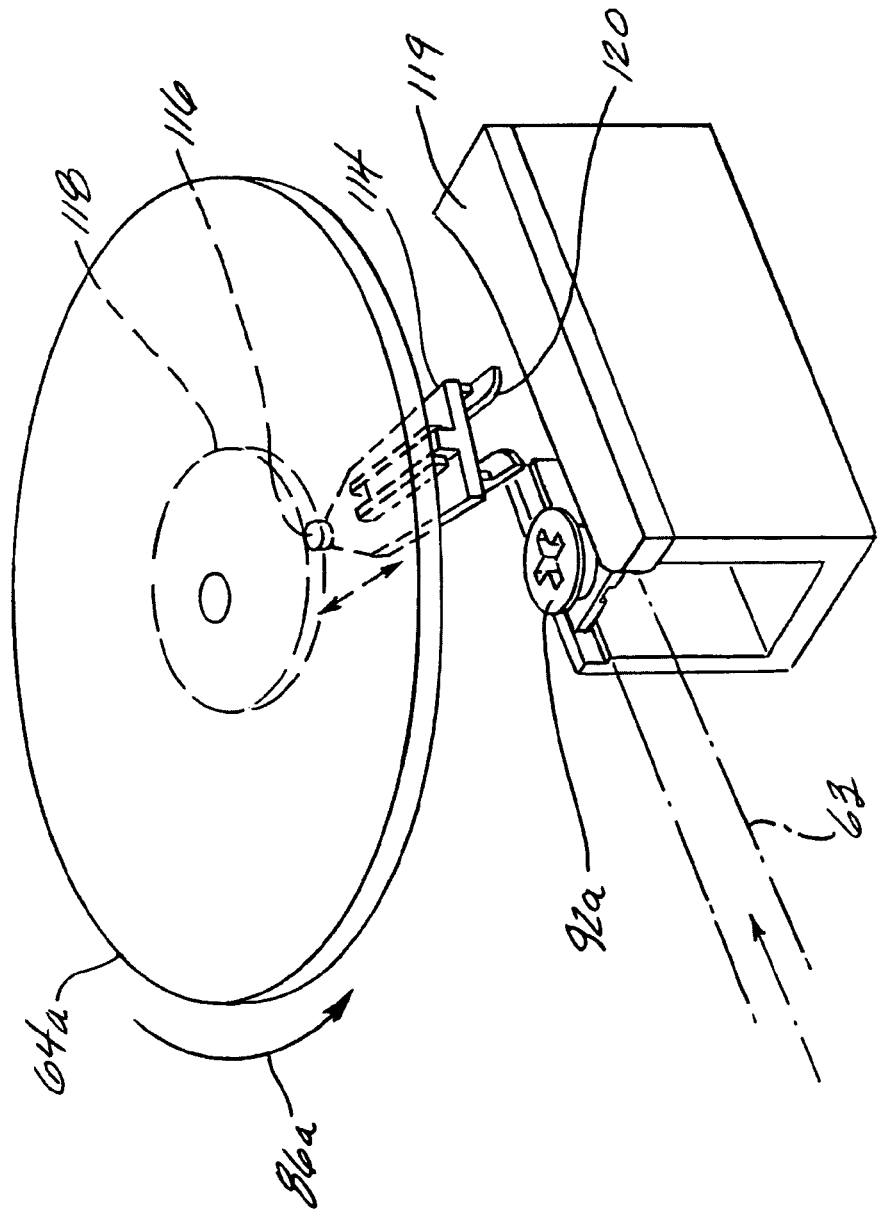
FIG. 7 is a schematic diagram of a continuous motion component escapement system for moving transfer pucks from a conveyor to a processing machine.

As shown in FIG. 7, a disk 64a rotates in the direction of arrow 86a, causing radially sliding blocks 114, each with a cam follower 116, to rotate as well. The cam followers 116 push against a stationary cam 118, located under disk 64a. Pucks 92a (only one shown) are moved into a capture location by a high slip conveyor 63 (shown in dashed lines), queue up at a curved guide 119 at the entrance to the system, and are grasped by grippers 120. Blocks 114 are retracted at a capture location such that the spacing between grippers 120 equals the spacing of the pucks on the conveyor. A first block 114 grasps the lead puck in the queue and, as disk 64a rotates, the pucks on the conveyor follow and the next block 114 grasps the next puck. As disk 64a rotates, blocks 114 move radially outward to a delivery position and pucks 92a are subsequently transferred to a processing machine at the desired spacing (behind disk 64a shown in FIG. 7), which is greater than their spacing in the queue. In other embodiments, as pucks 92a leave the conveyor and the capture location, their spacing can be decreased compared to their spacing as they arrive at the system, depending on the motion of sliding blocks 114 based on the profile of stationary cam 118.

All of the new motion escapement systems include a standard drive and control system (not shown) that cause disk 64, 64a to rotate and to control the speed at which it rotates. At process speeds, disk 64 can rotate at speeds of, e.g., 0 to 60 rpm, or can start, stop, accelerate, and/or decelerate without consequence to the proposed system, which will stay synchronized by virtue of its geometric simplicity. This embodiment incorporates a direct drive servo-system for the disk drive, but the drive system can be any type or form that can provide relatively smooth and stable control.

In addition, the system operates in conjunction with a component feeder 62a that is arranged to singulate components and feed them to the capture location in an orientation that enables the component holder to grip individual components.

Continuous Feed of Component Material Strip

Figure 8:
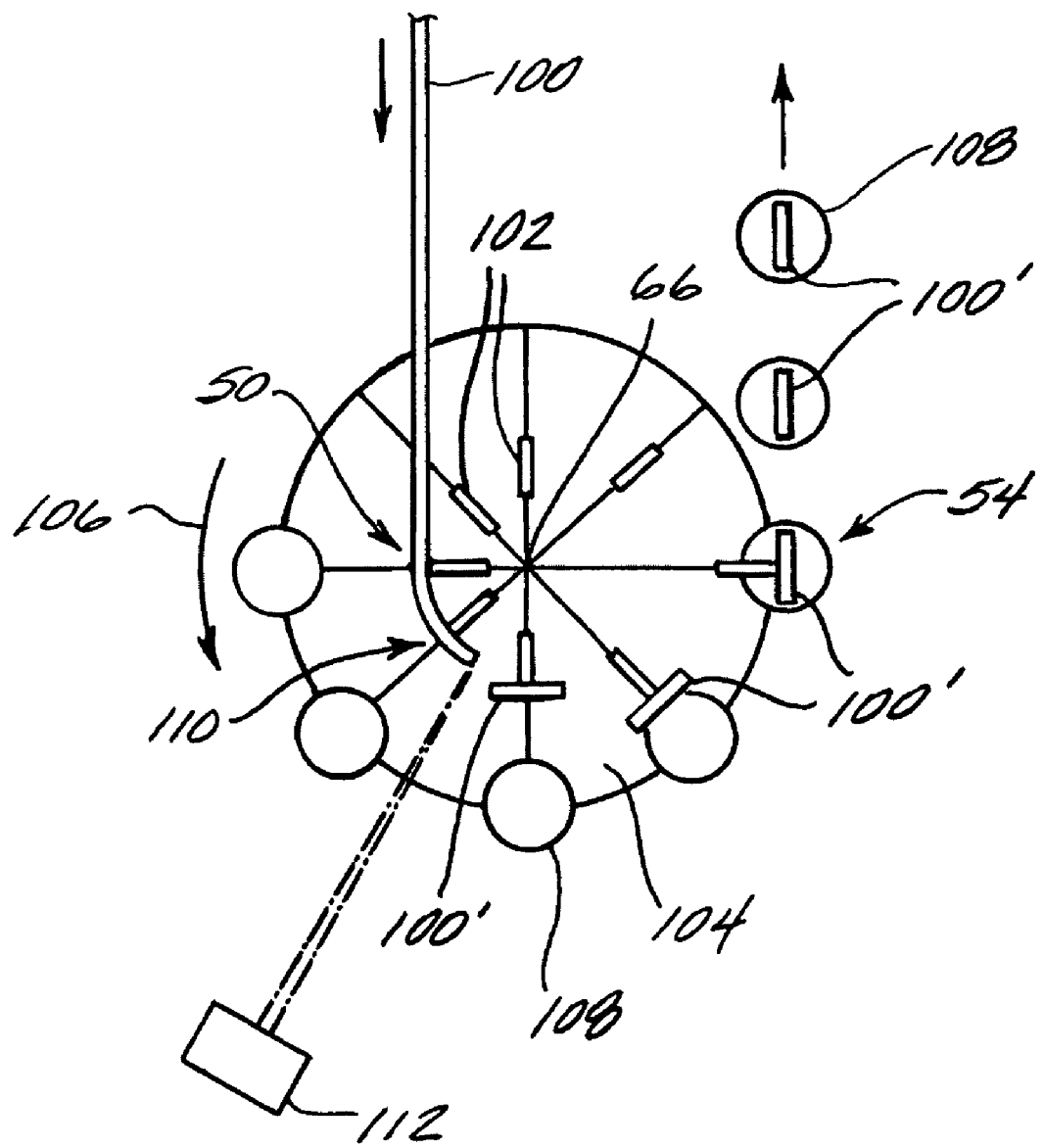
FIG. 8 is a schematic diagram of a continuous motion component escapement system for a continuous strip of component material that is cut to form inserts that are transferred to transfer pucks, ready to move into a processing machine or assembled directly to other components already resident on the puck.

The new systems can also be designed to accommodate components that arrive to the continuous motion escapement apparatus as a continuous strip of component material. As shown in FIG. 8, a continuous strip 100 of component material, e.g., plastic or metal, is supplied to a capture location 50. A component holder 102 grips the strip and moves as disk 104 rotates in the direction of arrow 106. Component receivers 108 are brought into contact with disk 104.

Figure 11:
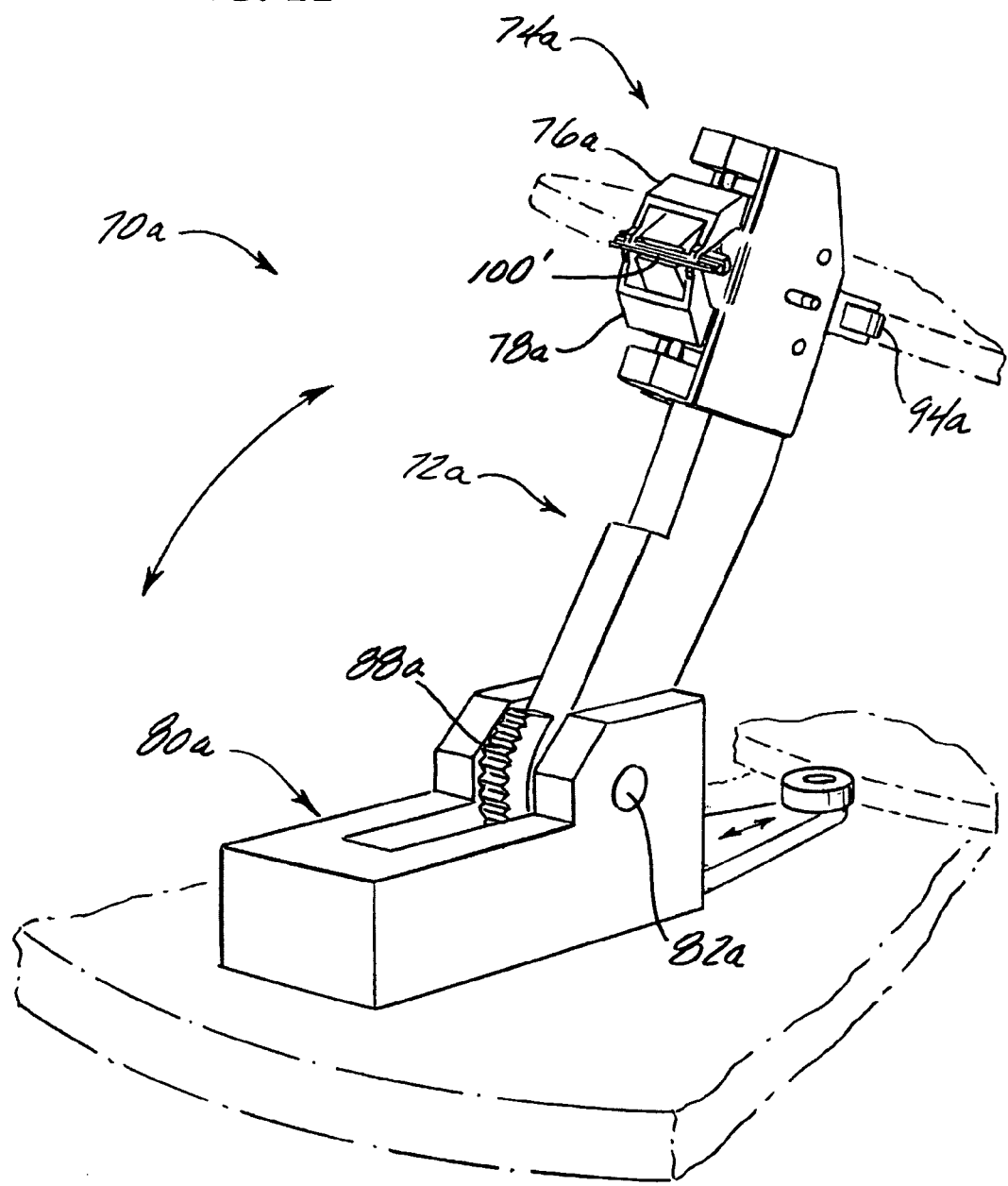
FIG. 11 is a schematic diagram of a component transfer mechanism of the continuous motion escapement system of FIGS. 8 to 10.
Figure 12A:
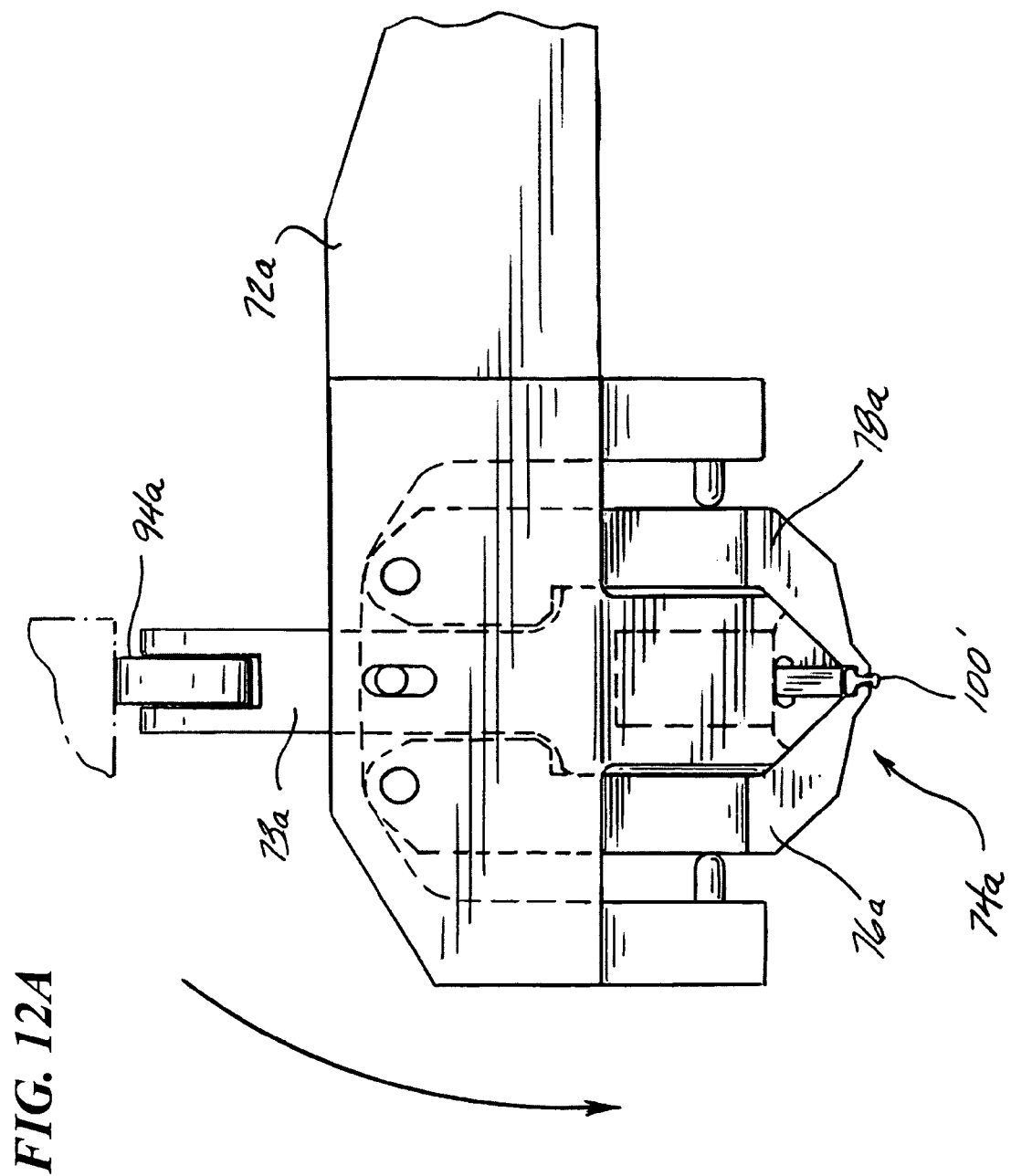
FIG. 12A is a close-up schematic side view of the gripper jaws of the component transfer mechanism of FIG. 11 holding an individual insert strip.
Figure 12B:
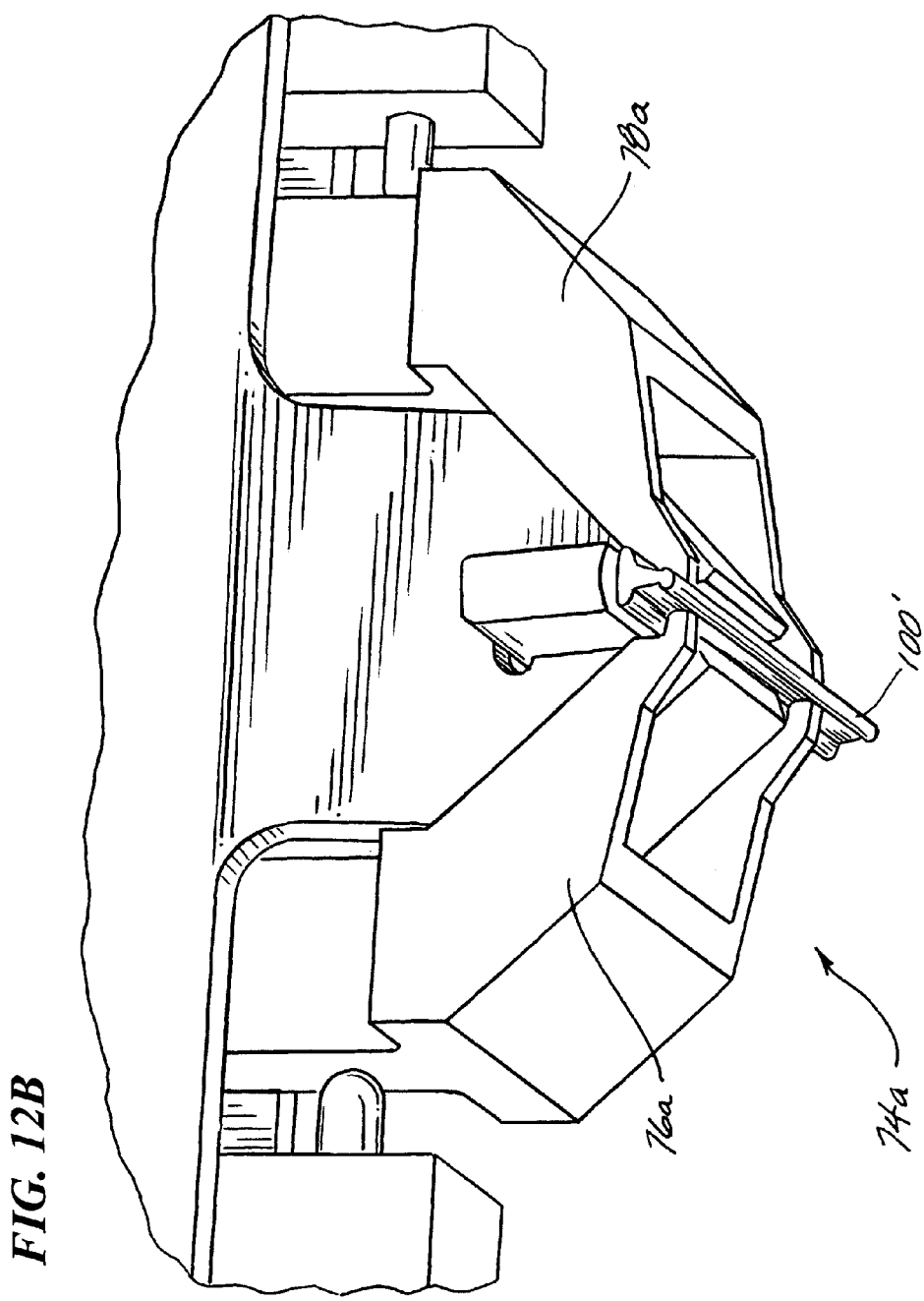
FIG. 12B is a close-up schematic three-quarter view of the gripper jaws of the component transfer mechanism of FIG. 11 holding an individual insert strip.

As disk 104 rotates, the strip of material is drawn into a capture location 50 tangent to the path of the grippers (76a and 78a, as shown in FIGS. 11, 12A, and 12B), which sequentially lock onto the strip 100 as disk 104 rotates. The holders 102 move the strip in an arc into a cutting zone 110 where the strip is cut between adjacent grippers by a cutting device, such as a slicing blade or so-called "flying knife" (described below) or a laser 112. In some embodiments in which the disk rotates very rapidly, the blade or laser beam may move from side to side in the direction of motion of the strip (and then back "upstream") to track the moving strip of component material and provide a clean, radial cut. Once the strip 100 is cut into individual components 100', the component holders 102 continue on their path to the delivery location 54 and release and insert the individual strip components 100' into a component receiver 108. As they leave the delivery location on their respective component receivers, the individual components 100' are spaced apart with the precise distance required for the next processing step.

Figure 9:
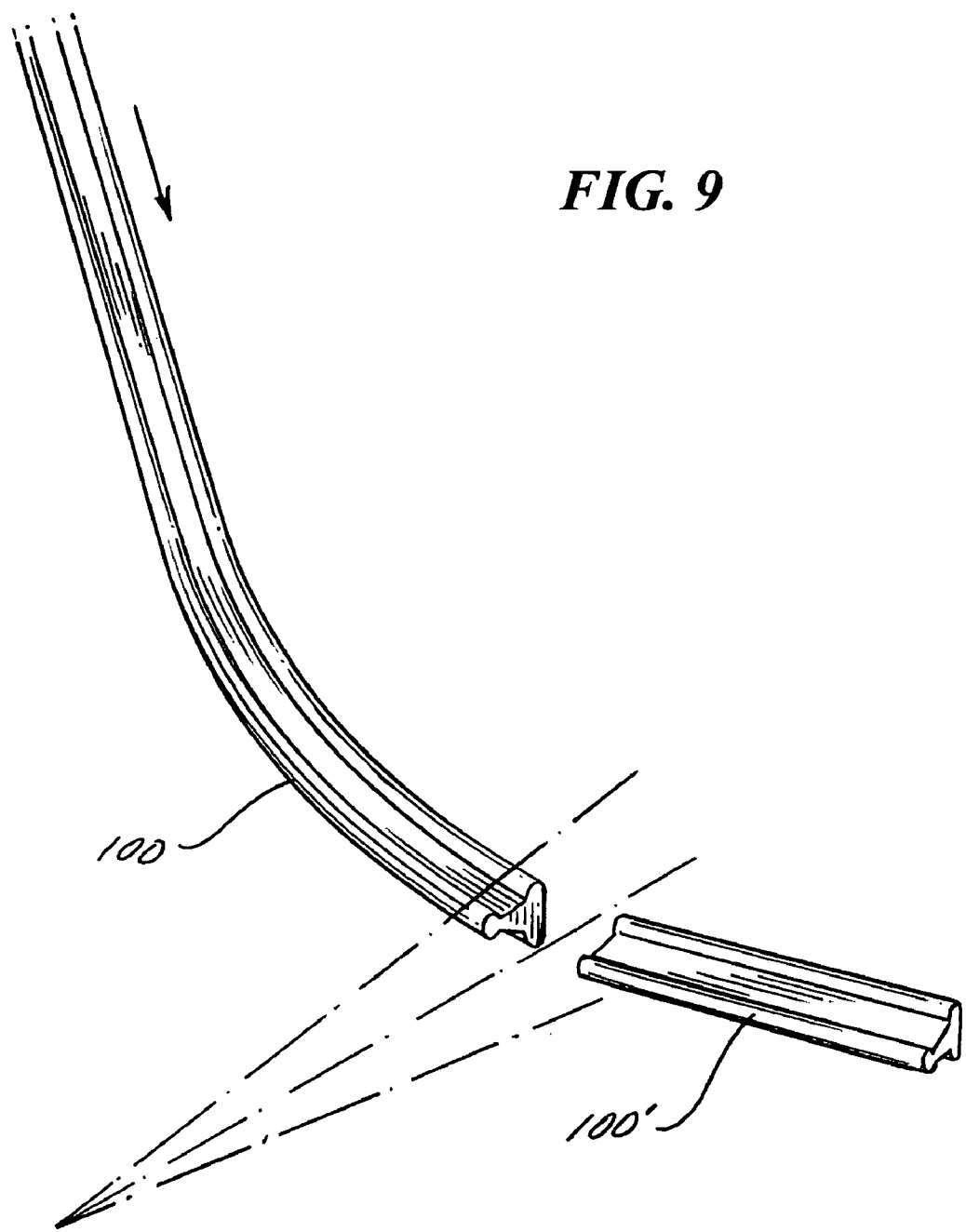
FIG. 9 is schematic perspective view of a continuous strip of component material that is cut by a laser to form individual inserts.
Figure 10:
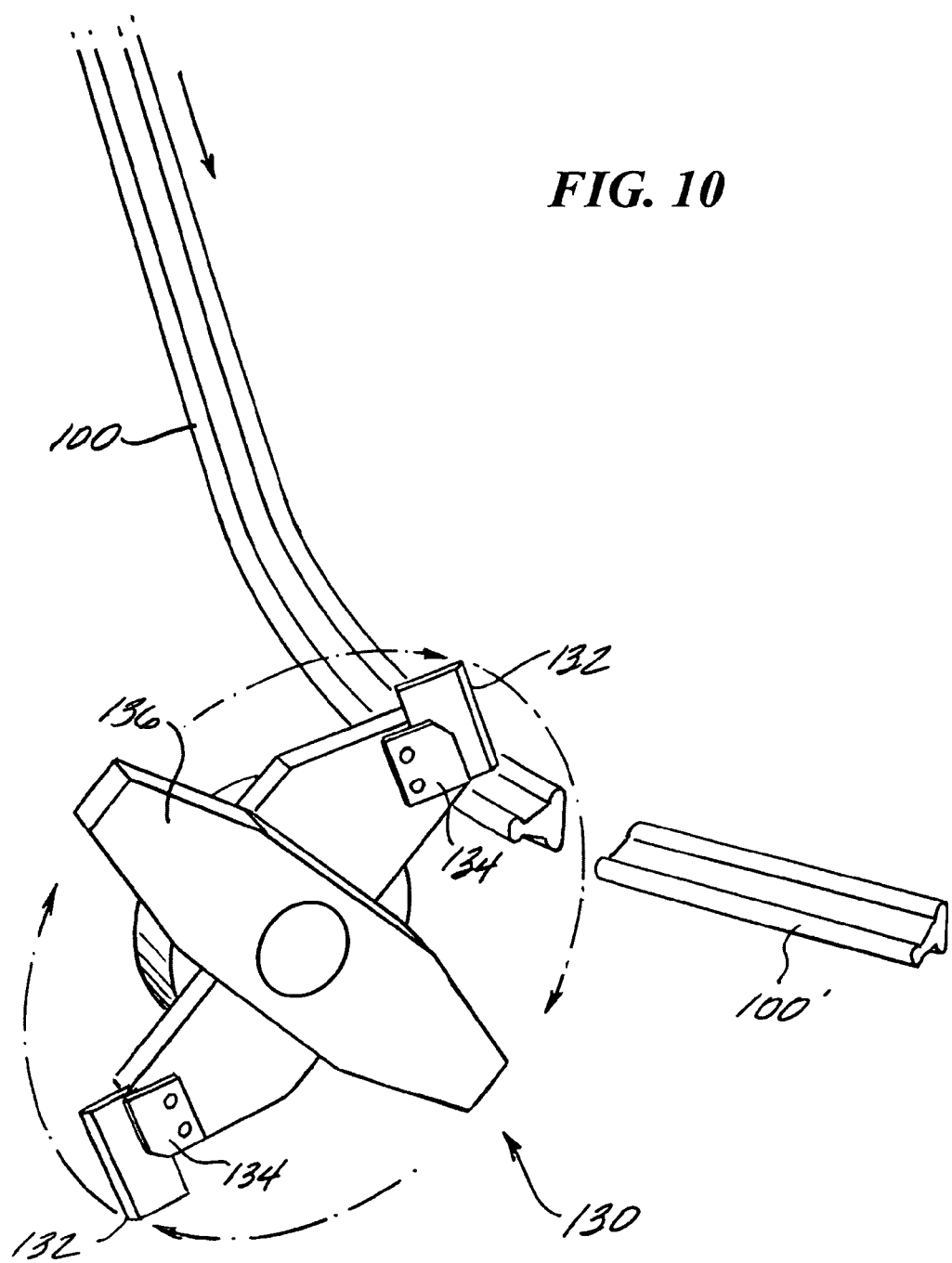
FIG. 10 is a schematic perspective view of an embodiment of a continuous motion component escapement system for a continuous strip of component material that is cut by including a flying knife cutter used to slice through a strip of component material.

FIG. 9 shows a continuous strip of component material 100 that has been cut by the laser into an individual component 100'. Laser cutting of the strip of material occurs within cutting zone 110 as seen in FIG. 8. Alternatively, the cutting can be done by a blade or knife. For example, FIG. 10 shows an embodiment including a flying knife cutter 130 used to slice through the strip of component material 100 in cutting zone 110. Flying knife 130 includes at least two blades 132 in blade holders 134 on a rotating carrier 136. As carrier 136 rotates, blades 132 pass through the strip of material 100. The spacing between blades, the rate of rotation of carrier 136, and the speed of the strip of material cause the cuts to be made at a precise spacing to provide a cut strip of component material 100 that is exactly the proper length. The cuts are made between two component transfer mechanisms 70a (which are not shown in FIG. 10) gripping the continuous strip of component material 100 and the individual component 100', respectively.

FIG. 11 shows a component transfer mechanism 70a, which is similar to the component transfer mechanism 70 shown in FIG. 4, but designed to grip a narrow strip of component material, hold the strip while it is cut (e.g., with positive grip on either side of the cut by adjacent component transfer mechanisms), and then continue holding the individual cut component until it is delivered to the delivery location 54.

Component transfer mechanism 70a includes an arm 72a, a component holder 74a with gripping jaws 76a and 78a, base 80a, and pivot 82a. Arm 72a is in an angled capture position, with jaws 76a and 78a holding a cut strip component 100'. FIGS. 12A and 12B show enlarged views of component holder 74a, with gripping jaws 76a and 78a holding a cut strip of plastic 100'. Rotation of arms 72a about pivot 82a is controlled by gear wheel sections 88a. As disk 104 rotates, a stationary cam on the disk (as shown for cam 98 on disk 64 in FIGS. 6A and 6B) causes the arms 72a to rotate down to deposit the strip of plastic 100' into a nest on a puck 108. The motion of arms 72a is similar to that of arms 72 shown in FIGS. 4A-4C and 6A-6C. Because the cam has a smooth contour, the distance of the component holder 74a (and thus the component 100') from the central axis 66 changes continuously as the component transfer mechanism 70a moves the component 100' from the capture location 50 (FIG. 9) to the delivery location 54 (FIG. 9). Of course, there are other ways to get the arms to rotate, e.g., individual small servomotors can be used on the disk, or different cam actuators can be used. For example, the arms can be driven directly by a globoidal 3-dimensional cam, obviating the need for a gear and rack mechanism.

As shown in FIGS. 12A and 12B, each of arms 72a has a roller/cam follower 94a that contacts a plunger 73a that, in turn, pushes down on component holder 74a, causing the gripping jaws 76a and 78a to release the cut component strip 100' and press this component strip 100' into a component receiver 108 in much the same way as plunger 73 pushes a component into a component holder 74 as shown in FIGS. 6A and 6B.

In this embodiment, the distance of the component holder 74a to the central axis 66 increases from the capture location 50 at the component strip infeed guide 101 to the delivery location 54 at the component receiver 108. This increase in distance translates into an increase in the spacing distance between components as they leave the delivery location (from a spacing of zero when the components are part of one continuous strip as they arrive to the capture location). In addition, the individual components, once cut from the strip, move along a path that is at an angle to the surface of disk 104.

Applications

The new controlled, continuous motion escapement systems can be configured to operate with a wide variety of types of components. For example, the components can be individual razor cartridge components, such as cartridge housings or hoods, inserts for such housings, and metal blades and/or blade supports or trimmer components. The components can also be continuous strips of material that are cut by the system into individual components, such as lubricating strips made of plastics that contain polymers, or blades cut from long strips of steel.

Other systems can be made to move batteries and their components such as electrodes, housings, and contacts; electric toothbrush brushheads and their components; the various components in munitions, cigarettes, and medical devices; and parts, e.g., in subassemblies, in the auto and aircraft industries. In general, the new methods and systems can be used for the assembly of any components that can be oriented and delivered in a feed track.

Other Embodiments

A number of embodiments of the invention have been described. Nevertheless, it will be understood that various modifications may be made without departing from the spirit and scope of the invention. Accordingly, other embodiments are within the scope of the following claims.

List of Elements

| Elements | Reference No. |
| --- | --- |
| components | 28 |
| rotating disk | 40 |
| component holder | 42 |
| central axis | 44 |
| capture position (location) | 50 |
| delivery location | 54 |
| continuous motion escapement system | 60 |
| component feeder | 62a |
| curved guide track | 62b |
| high slip conveyor | 63 |
| rotating disk | 64, 64a |
| central axis (rotating disk) | 66 |
| central shaft | 68 |
| component transfer mechanism | 70, 70a |
| arm (component transfer mechanism) | 72, 72a |
| plunger | 73, 73a |
| component holder | 74, 74a |
| gripping jaws | 76, 78; 76a, 78a |
| base (component transfer mechanism) | 80, 80a |
| pivot | 82, 82a |
| component | 84 |
| gear wheel sections | 88, 88a |
| component nest | 90 |
| component receiver | 92 |
| puck | 92a |
| roller/cam follower | 94, 94a |
| cam followers | 95 |
| (stationary) overhead cam | 96 |
| sliding members | 97 |
| stationary cam | 98 |
| coil springs | 99' |
| rack (linear gear) | 99 |
| individual components | 100' |
| strip of component material | 100 |
| component strip infeed guide | 101 |
| component holder | 102 |
| disk | 104 |
| component receiver (puck) | 108 |
| cutting zone | 110 |

-continued

| Elements | Reference No. |
| --- | --- |
| laser | 112 |
| radially sliding blocks | 114 |
| cam follower | 116 |
| stationary cam | 118 |
| curved guide | 119 |
| grippers | 120 |
| flying knife cutter | 130 |
| blades | 132 |
| blade holders | 134 |
| rotating carrier | 136 |

What is claimed is:

1. A continuous motion escapement system comprising
a rotatable disk comprising a central axis;
a capture location at a first distance from, and at a first radial position of, the central axis;
a delivery location at a second radial position of the central axis, the delivery location is at a second distance from the central axis different than the first distance; and wherein the distance of the component from the central axis changes as the component transfer mechanism moves the component from the capture location to the delivery location; and
a plurality of component transfer mechanisms arranged on the disk, wherein each component transfer mechanism comprises a component holder configured to actively grip a component at the capture location, and wherein each component transfer mechanism is configured to move the component holder from the capture location to the delivery location, enable the component holder to deposit the component in a defined orientation at the delivery location, and return the now empty component holder to the capture location within one rotation or less of the disk, wherein as the disk rotates, the component holder moves radially from the first distance at the capture location to the second distance at the delivery location along a path at an angle to a surface of the disk.

2. The system of claim 1, wherein the second distance is larger than the first distance.

3. The system of claim 1, wherein the distance of the component from the central axis changes continuously as the component transfer mechanism moves the component from the capture location to the delivery location.

4. The system of claim 1, further comprising a drive that causes the disk to rotate about the central axis and a controller that controls the speed of rotation, wherein a continuous rotation of the disk causes the component transfer mechanisms to deliver a continuous stream of components from the capture location to the delivery location.

5. The system of claim 1, further comprising a component feeder that is arranged to singulate components and feed them to the capture location in an orientation that enables the component holder to grip individual components.

6. The system of claim 1, wherein the component transfer mechanisms are arranged symmetrically on the disk about the central axis.

7. The system of claim 1, wherein each component transfer mechanism moves the component holder radially outwardly from the capture location to the delivery location, and the second distance from the central axis is larger than the first distance from the central axis.

8. The system of claim 1, wherein each component transfer mechanism moves the component holder radially inwardly from the capture location to the delivery location, and the second distance from the central axis is smaller than the first distance from the central axis.

9. The system of claim 1, wherein each component transfer mechanism comprises an arm having a distal end and a proximal end, wherein the component holder is attached to the distal end, and wherein the arm pivots about the proximal end causing the component holder to move from the first distance from the central axis to the second distance from the central axis.

10. The system of claim 9, further comprising a cam, wherein the arms pivot in response to contact with the cam.

11. The system of claim 9, wherein each arm moves the component holder radially outwardly from the capture location to the delivery location, and the second distance from the central axis is larger than the first distance from the central axis.

12. The system of claim 9, wherein each arm moves the component holder radially inwardly from the capture location to the delivery location, and the first distance from the central axis is larger than the second distance from the central axis.

13. The system of claim 1, wherein each component transfer mechanism comprises a block, wherein the component holder is attached to the block, and wherein as the disk rotates the block moves from the first distance at the capture location to the second distance at the delivery location along a path parallel to a surface of the disk.

14. The system of claim 13, further comprising a cam, wherein the block slides radially outwardly in response to contact with the cam.

15. The system of claim 1, wherein as the disk rotates the component holder moves radially from the first distance at the capture location to the second distance at the delivery location along a path parallel to a surface of the disk.

16. The system of claim 1, wherein the disk is circular.

17. A method of continuously transferring a stream of components from a capture location to a delivery location, the method comprising:
capturing and gripping each component with a component transfer mechanism at a capture location at a first distance from, and at a first radial position of, a central axis;
moving the component transfer mechanism gripping the component to a delivery location at a second radial position with respect to the central axis different from the first radial position; and
depositing the component in a defined orientation into a component receiver at the delivery location wherein the capture location is positioned on a first plane, the delivery location is positioned on a second plane at a different level than the first plane.

18. The method of claim 17, wherein each component is gripped individually.

19. The method of claim 17, wherein the delivery location is at a second distance from the central axis different than the first distance; and wherein the distance of the component from the central axis changes as the component transfer mechanism moves the component from the capture location to the delivery location.

20. The method of claim 17, wherein the distance of the component from the central axis changes continuously as the component moves from the capture location to the delivery location.

21. The method of claim 19, wherein a first spacing between components as they arrive at the capture location is smaller than a second spacing between components as they leave the delivery location, and the first distance from the central axis is smaller than the second distance from the central axis.

22. The method of claim 19, wherein a first spacing between components as they arrive at the capture location is larger than a second spacing between components as they leave the delivery location, and the first distance from the central axis is larger than the second distance from the central axis.

23. The method of claim 17, wherein the capture location and delivery location are on one plane.

24. The method of claim 17, wherein the component receiver comprises individual component nests into which the components are inserted in a predetermined orientation.

25. The method of claim 21, wherein the components are fed to the capture location in a continuous stream and the first spacing between components is 30 mm or less.

26. The method of claim 25, wherein the components leave the delivery location at a second spacing of 50 mm or more.

27. The method of claim 17, wherein the components are in a first orientation at the capture location and are deposited into the component receiver in a second orientation, different than the first orientation.

* * * * *